United States Patent [19]

Yoshimura

[11] Patent Number: 5,790,702
[45] Date of Patent: Aug. 4, 1998

[54] HIGH SPEED PATTERN RECOGNITION SYSTEM

[75] Inventor: Shin-ichi Yoshimura, Chiba, Japan

[73] Assignee: Sony Corporation, Tokyo, Japan

[21] Appl. No.: 797,672

[22] Filed: Jan. 31, 1997

Related U.S. Application Data

[63] Continuation of Ser. No. 295,974, Aug. 25, 1994, abandoned.

[51] Int. Cl.$^6$ .......................... G06K 9/62; G06K 15/316
[52] U.S. Cl. ......................................... 382/209; 382/278
[58] Field of Search ................................ 382/131, 171, 382/154, 155, 174, 278, 209

[56] References Cited

U.S. PATENT DOCUMENTS

| | | | |
|---|---|---|---|
| 4,827,522 | 5/1989 | Matsuura et al. | 381/43 |
| 5,090,418 | 2/1992 | Squires et al. | 128/702 |
| 5,282,030 | 1/1994 | Nishimura et al. | 348/71 |
| 5,283,837 | 2/1994 | Wood | 382/131 |
| 5,307,807 | 5/1994 | Valde's Sosa et al. | 128/653.1 |
| 5,432,864 | 7/1995 | Lu et al. | 379/52 |

OTHER PUBLICATIONS

S. Yoshimura, Fast Template Matching Based on the Normalized Correlation by Using Multiresolution Eigenimages, IROS '94 IEEE Proceedings of the IEEE/RSJ/GI International Conference on Intelligent Robots and Systems, at 2086–2093.

R. Hilai and J. Rubinstein, Recognition of rotated images by invariant Karhunen–Loeve expansion, J. Opt. Soc. Am. A/Vol. 11 No. 5, May 1994, at 1610–1618.

A. Jouan and H. Arsenault, Improved matched filter based on Radial eigenfuntions, Journal of Modern Optics, 1989, vol. 36, No. 12, at 1661–1670.

B. Lee, Translation, Scale and Rotation Invariant Pattern Recognition Using Principal Component Analysis (PCA) and Reduced Second–Order Neural Network, Neural, Parallel & Scientific Computations, 1995, at 417–431.

Primary Examiner—Joseph Mancuso
Assistant Examiner—Jayanit K. Patel
Attorney, Agent, or Firm—Harold T. Fujii; Jerry A. Miller

[57] ABSTRACT

A pattern recognition system uses a Karhunen-Loéve expansion to separate unique characteristics from common characteristics. An approximation using a reduced number of series terms produces a correlation output with a dramatically reduced number of computations.

2 Claims, 6 Drawing Sheets

HIGH SPEED PATTERN RECOGNITION SYSTEM

This is a continuation of application Ser. No. 08/295,974 filed on Aug. 25, 1994 which is hereby incorporated by reference now abandoned.

BACKGROUND

1. Field of the Invention

The present invention relates to a high speed pattern recognition system. Specifically, the invention relates to a system for seeking the location and orientation of a certain pattern which exists in an image.

2. Background of the Invention

Factory automation has been well adapted to the field of assembly. Without relying on the human eyes, the location and orientation of parts to be assembled are confirmed by a pattern recognition processing system. Based on the information obtained, a robotics assembling process is then performed. Both high speed and high precision are required in this pattern recognition system.

A general pattern recognition system based on correlation technology will be explained with reference to FIG. 1. Images which contain the pattern to be recognized are sensed by a camera or similar imaging device and sent to an image input port 1. The images are converted there from analog to digital so that digital processing can be applied at a later stage. The cut out port 2 cuts out and retrieves a portion of the input image. The amount of information cut out by the port 2 is the same as the number of vector elements representing a standard pattern to be recognized. The standard pattern is stored in memory in a storing port 3. For example, the pattern may be stored in locations designated by (0), (−1), (−2), (1), and (2). The storing port 3 stores a standard pattern 9 at location (0) in which the orientation of the part equals a referenced angle, a pattern 10 at location (+1) in which the referenced standard pattern rotates by a certain angle along a positive direction, and a pattern 11 at location (+2) in which the standard pattern further rotates by a certain angle along a positive direction. The storing port 3 also stores a pattern 8 at location (−1) in which the referenced standard pattern rotates by a certain angle along a negative direction, and a pattern 6 at location (−2) in which the standard pattern further rotates by a certain angle along a negative direction.

Since the pattern to be recognized in the input image may be in a random orientation, several standard patterns are prepared. Each of these patterns is rotated with respect to the non-rotated standard pattern 9. Each of the standard patterns is represented by (N) data points, where (N) is equal to the product of the number of horizontal and vertical pixels in the configuration. In other words, each standard pattern is represented by an (N) dimensional vector.

A pattern select port 4 can specifically select one of the patterns among locations (0) to (±2) which are stored in the storing port 3. As each of the standard patterns is represented by an (N) dimensional vector, the output of pattern select port 4 is also represented by an (N) dimensional vector.

A correlation operating port, or correlator, 5 performs a cross-correlating operation for two vectors having the same dimensions. The (N) dimensional vector information which is output from the image cut out port 2 is applied to one input of the correlator 5, while (N) dimensional vector information which is output from the pattern select port 4 is applied to another input of the correlator 5.

Referring to FIG. 2, correlation operation will be explained. Where the standard pattern 12 is represented by a 5×5 pixel vector as shown, the vector elements number (N) is 25. The standard pattern 12 is simply represented by $x_i$ where $i=1, 2, \ldots 25$.

Moreover, where a large area is input as part of the sensed image 14, a smaller part or extracted area 13 can be identified. Extracted area 13 is represented by pixels corresponding to $y_1, Y_2, \ldots$ and $Y_{25}$ which are defined in a manner similar to that for the standard pattern. The image of extracted area 13 is thus simply represented by $y_i$ where $i=1, 2, \ldots 25$. When $x_i$ and $y_i$ are determined, the following correlation operation is performed.

$$\frac{N \sum_{j=1}^{N} x_j y_j - \sum_{j=1}^{N} x_j \sum_{j=1}^{N} y_j}{\sqrt{N \sum_{j=1}^{N} x_j^2 - \left[\sum_{j=1}^{N} x_j\right]^2} \sqrt{N \sum_{j=1}^{N} y_j^2 - \left[\sum_{j=1}^{N} y_j\right]^2}} \qquad \text{EQUATION [1]}$$

This equation defines the normal cross-correlation. However, if the system is constructed to perform the operation of equation [1], sequential calculation of numerous terms is required and, therefore, high speed processing cannot be expected. Thus, preprocessing is generally provided to minimize the number of terms used in equation [1].

In other words, the mean value of all information is calculated with respect to pixels at the extracted area 13. Considering the mean value as the offset amount, a subtraction operation is performed from each pixel data value at a normalizer 65. The offset value (a) can be obtained from the following equation with respect to the pixels in the extracted area.

$$a = \frac{1}{N} \sum_{i=1}^{N} y_i \qquad \text{EQUATION [2]}$$

Thereafter, the following normalized pixel data values can be obtained from each of the respective element.

$$\bar{y}_i = y_i - a \qquad \text{EQUATION [3]}$$

The information from the extracted pixels thus obtained will be represented by vectors as follows.

$$\bar{y} = [\bar{y}_1, \bar{y}_2, \ldots \bar{y}_N] \qquad \text{EQUATION [4]}$$

With regard to each of the standard patterns, on the other hand, the offset value is subtracted from all vector elements so that the mean variable-density value may become zero. This offset value $(a_i)$ is calculated as follows.

$$a_i = \frac{1}{N} \sum_{j=1}^{N} x_{ij} \qquad \text{EQUATION [5]}$$

Thereafter, the following can be obtained from each respective element of the standard patterns.

$$\bar{x}_{ij} = x_{ij} - a_i \qquad \text{EQUATION [6]}$$

The elements thus obtained will be represented by vectors as follows.

$$\bar{x}_i = [\bar{x}_{i1}, \bar{x}_{i2}, \ldots \bar{x}_{iN}] \qquad \text{EQUATION [7]}$$

$$\sum_{j=1}^{N} \bar{x}_j \sum_{j=1}^{N} \bar{y}_j = 0 \qquad \text{EQUATION [8]}$$

$$\left[ N \sum_{j=1}^{N} \bar{x}_j \right]^2 = 0, \left[ N \sum_{j=1}^{N} \bar{y}_j \right]^2 = 0 \qquad \text{EQUATION [9]}$$

The correlation equation [1] can be, therefore, rewritten and simplified.

$$C_i = \frac{N \sum_{j=1}^{N} \bar{x}_{ij}\bar{y}_j}{\sqrt{N \sum_{j=1}^{N} \bar{x}_j^2} \sqrt{N \sum_{j=1}^{N} \bar{y}_j^2}} \qquad \text{EQUATION [10]}$$

The first term of the denominator can be predetermined by making a calculation with respect to only the standard patterns. The term in the numerator and the second term in the denominator should be calculated on a real time basis for the process of pattern matching.

The numerator represents an inner product of vectors representing the standard pattern and vectors representing the input image. The denominator represents a norm of each standard pattern and a norm of the cut out area. Therefore, correlation equation [10] can be rewritten as follows.

$$C_i = \frac{\bar{x}_i \bar{y}}{\|\bar{x}_i\| \|\bar{y}\|} \qquad \text{EQUATION [11]}$$

Note that the coefficient (N) in the numerator of equation [10] has been disregarded for the purpose of simplifying the calculation because it is a constant. As seen in equation [11], the normal cross-correlation operation to the input image with the standard pattern can be realized by seeking an inner product between a vector representing a normalized cut out area and a vector representing a normalized standard pattern. The correlating operation can be therefore performed at the operator 66 in accordance with equation [11] by completing the procedure described above.

The operation can be performed by incrementally moving the extracted area 13 previously retrieved. It is known that the cross-correlation value of two vectors is maximized when the vectors describe coincidental patterns. Utilizing this characteristic, the coordinate position of the input image which produces the maximum cross-correlation value can be obtained. The standard pattern is defined at this position.

The procedure for performing the above mentioned cross-correlating operation will be explained next with the structure previously shown. The image information, including the object to be recognized, is taken through the image input port 1 and then cut out at the image cut out port 2 where a certain range of information can be retrieved. Configuration of the cut out area at this time could be the same as that of the standard patterns being stored in the storing port 3. In other words, the cut out image information coincides with the pixels in the columns and rows of the standard pattern. Therefore, the cut out image is also represented by an (N) dimensional vector. On the other hand, the pattern 9 at location (0) is first selected by the pattern select port 4 as a standard pattern.

Thus, a one to one relationship between the cut out image and the standard pattern is determined. The normal cross-correlation operation is then performed to calculate the correlation value of this cut out area.

Next, the standard pattern to be selected at the pattern select port 4 is changed to the next pattern, which is the pattern 8 at location (−1). The correlation value is calculated with respect to the same cut out area to which the normal cross-correlation operation was previously performed with the pattern 9 at location (0). Likewise, this correlation operation is repeated with respect to all of the remaining standard patterns. In the present example, five correlation operations are repeated with respect to the same cut out area.

A so-called scanning process in which the cut out portion is shifted in turn by a single pixel step is then performed so that the above pattern matching process can be applied to the entire input image. Next, the position where an object exists in accordance with its standard pattern can be identified by obtaining the cut out position which results in the highest numerical correlation value with respect to each of the standard patterns.

With the pattern matching process previously discussed, the number of calculations required for a given cut out image can be described with the following equations.

$$N \sum_{j=1}^{N} x_j y_j \qquad \text{EQUATION [12]}$$

$$N \sum_{j=1}^{N} y_j^2 \qquad \text{EQUATION [13]}$$

Multiplication operations must be performed (N+1) times in equation [12] and (N) times in equation [13]. Though there are other multiplying operations, they can be disregarded as (N) becomes large. Therefore, approximately (2N) multiplication operations are required for each standard pattern. Assuming the numbers of patterns to be recognized is (P), (2NP) multiplication operations are required with respect to each cut out image because the above operations should be performed respectively for each of the standard patterns.

When this kind of pattern recognition apparatus is utilized for a parts assembly process or the like, each standard pattern is required to have approximately 100 pixels in each column and row, thereby forming a vector with size N=10,000. Thus, recognition of a single standard pattern requires (2NP) or (2×10,000×1)=20,000 multiplication calculations. When the number of objects to be recognized is increased, it is seen that the number of calculations is increased dramatically and processing speed is correspondingly decreased to an unsatisfactory level.

In the simple pattern matching process explained, all pixels are equally treated in the standard pattern, regardless of whether there are any significant characteristics in the pattern. Since images are not always oriented along a single direction, several standard patterns with slightly different rotations should be prepared in addition to the referenced standard pattern. In this case, when a rotary angle of an image actually taken from an object is not the same as one of the prepared standard patterns, its correlation value decreases dramatically. This may result in a failure to retrieve the most appropriate standard pattern.

SUMMARY OF THE INVENTION

It is, therefore in view of the above disadvantages, an object of the present invention to provide a high speed processing system for recognizing a pattern.

It is another object of the invention to provide a system for recognizing a pattern in which the correlation value doesn't decrease dramatically so that an improvement in recognition probability can be expected.

A method for recognizing a pattern, according to an embodiment of the invention includes the steps of providing a plurality of template patterns for correlation with an image to be recognized; expanding each template pattern into a common term and a plurality of unique terms using a Karhunen-Loéve expansion; correlating a sum of the common term and the unique terms with the image to be recognized for each expanded template pattern; and selecting a matching template pattern as a pattern with the highest correlation with the image to be recognized.

In order to accomplish the aforementioned and other objectives, a system for recognizing a pattern is presented. The system includes a memory for a common pattern to store a common term obtained by a Karhunen-Loéve Expansion to standard patterns, another memory to store a predetermined number of independent eigenvectors obtained by a Karhunen-Loéve Expansion to standard patterns, and a further memory to store weighting information such as coefficients corresponding to the eigenvectors of the respective standard patterns. A certain area of a picture to be processed is cut out by a cut off portion. The mean of information in the cut out area is subtracted from respective pixel information by a density normalizing portion. An inner product is operated on by an operating portion of common pattern correlating elements between normalized information of the cut out area obtained by the density normalizing portion and the common pattern stored in memory.

Another inner product is operated on by an operating portion of eigenvector correlating elements between normalized information of the cut out area obtained by the density normalizing portion and the eigenvector information stored in the other memory. An operating portion of pattern-depending correlation elements sums up products between the eigenvector correlating elements and the coefficients stored by the memory for weighting information on the eigenvectors. An adder portion of the correlating numerator value adds the common pattern correlating elements with the pattern dependency correlation elements. The system further comprises $|y_i|$ operating portions for calculating the norm of $y_i$, and $|x_i|$ storing portions for storing the norm of $x_i$. A multiplier portion for the correlative denominator value multiplies the norm of $y_i$ with the norm of $x_i$. A divider portion is formed by the correlating numerator value divided by the correlative denominator value.

In accordance with the present invention, the characteristics of expression which have been registered as a standard pattern can be taken by applying the Karhunen-Loéve Expansion to image processing. Even when an angle of an object in a picture actually taken is not the same as one of the previously prepared standard patterns, the correlation value doesn't decrease drastically. Therefore, an improvement can be expected in the probability of recognition.

Further, according to this invention, among the standard patterns expressed by the K-L Expansion, a portion is retrieved where the same operation is commonly performed on the plurality of standard patterns. By commonly utilizing the operation for a certain retrieved area, rapid progress is obtained for high speed processing without inviting a decrease in the probability of recognition.

DETAILED DESCRIPTION OF THE PREFERRED EMBODIMENT

Figure 1:
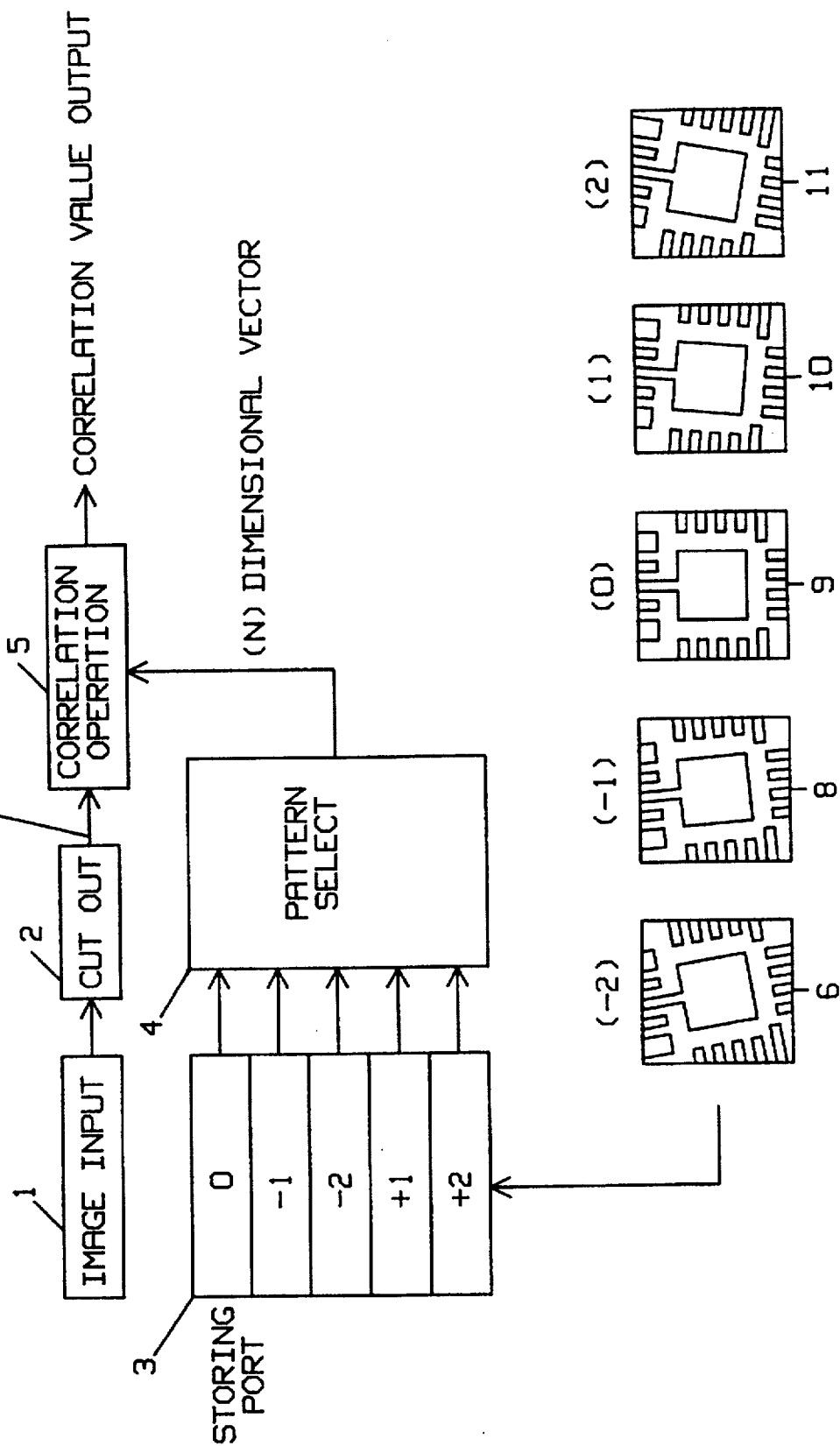
FIG. 1 shows a block diagram of a pattern recognition system based on general correlation technology.
Figure 2:
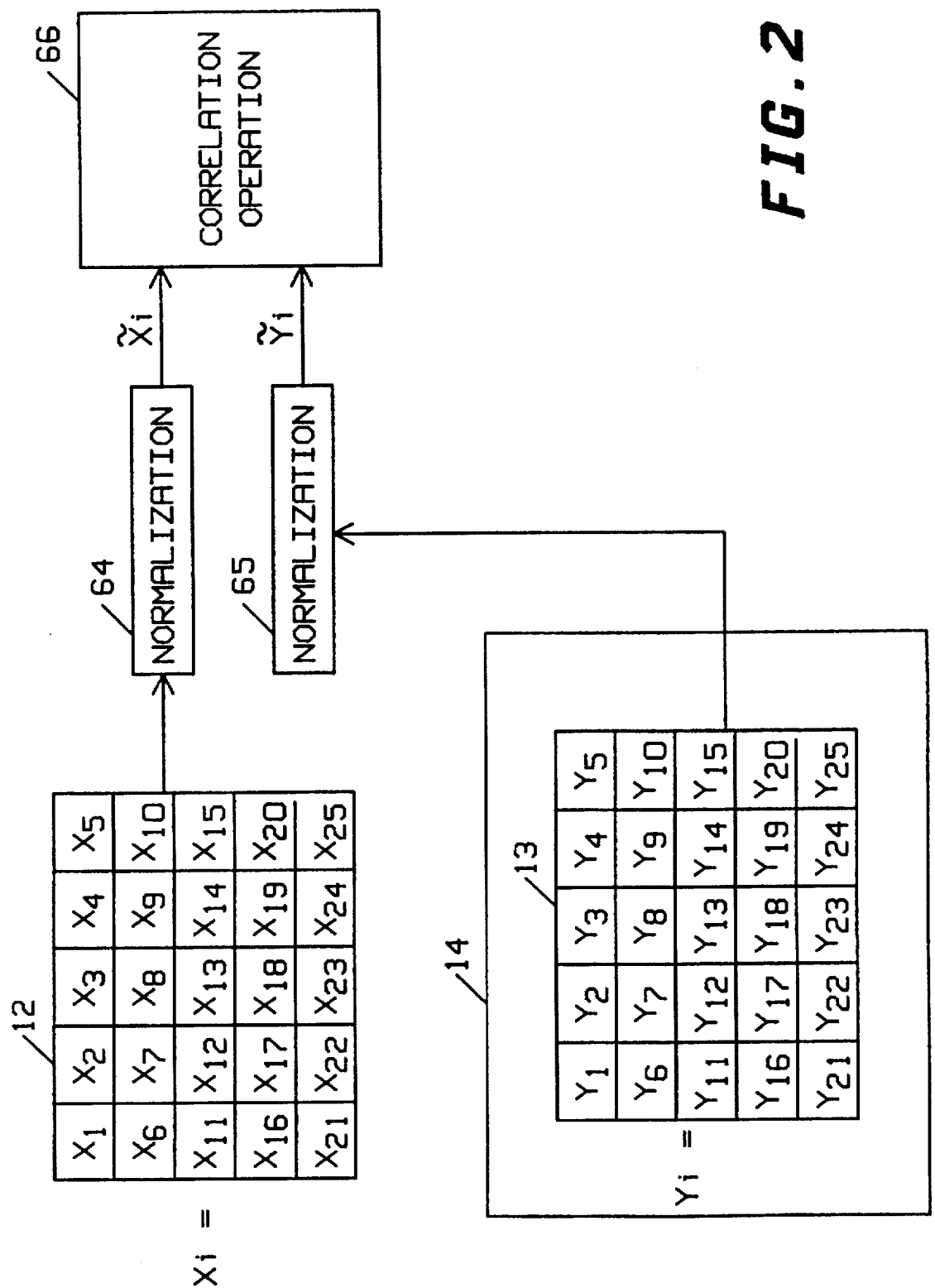
FIG. 2 shows an example of a correlation operation adopted in the system shown in FIG. 1.

Though the Karhunen-Loéve Expansion has been explained in other literature, the procedure of operation as used in the present invention will be briefly described here. In the present invention, elements having common characteristics to every standard pattern can be separated from elements having unique characteristics to each standard pattern by use of the K-L Expansion. These elements are represented by a form of linear coupling. Having combined with pairs of corresponding coefficients correspondingly depending on the standard pattern, each of the standard patterns is represented only by means of the above elements. The elements representing unique standard pattern characteristics have orthogonal vectors which are independent to each standard pattern. In accordance with this Expansion, the elements expressing the common characteristics represent approximate characteristics of a group of standard patterns. Therefore, a similar shape can be easily retrieved by pattern recognition. Since the separation regarding each standard pattern is performed by vector operation on independent orthogonal vectors, a similar effect can be expected with the so-called relaxation method for certain operations.

In this invention, the K-L Expansion is applied only to standard patterns. Specifically, the operations are performed as explained below.

(1) An offset value is subtracted so that the mean variable density value of all pixels becomes zero for each standard pattern. In other words, the offset value $(a_i)$ is calculated for each standard pattern as follows, $$a_i = \frac{1}{N} \sum_{j=1}^{N} x_{ij} \qquad \text{Equation [14]}$$

Thereafter, depending on the elements of each standard pattern, the following calculation is performed.

$$\tilde{x}_{ij} = x_{ij} - a_i \qquad \text{Equation [15]}$$

The elements thus obtained are represented by vectors.

$$\tilde{x}_i = [\tilde{x}_{i1}, \tilde{x}_{i2}, \cdots \tilde{x}_{iN}] \qquad \text{Equation [16]}$$

Hereafter, this is called the normalized standard pattern.

(2) Next, the mean $(c_j)$ is calculated as follows vector element by vector element corresponding to the total number of standard patterns (P).

$$c_j = \frac{1}{P} \sum_{i=1}^{P} \tilde{x}_{ij} \qquad \text{Equation [17]}$$

These elements are represented by a vector as follows.

$$C = [C_1, C_2 \cdots C_N] \qquad \text{Equation [18]}$$

(3) Based on the vectors obtained in steps (1) & (2), a covariance matrix (A) can be defined as follows.

$$A = \frac{1}{P} \sum_{i=1}^{P} (\tilde{x}_i - c)(\tilde{x}_i - c)^T \qquad \text{Equation [19]}$$

(4) The eigenvalue equation of the covariance matrix is obtained from step (3).

$$A e_j = \lambda_j e_j \qquad \text{Equation [20]}$$

By resolving the equation, eigenvector $e_j$ and eigenvalue $\lambda_j$ (j=1, 2, - - - P–1) are sought, though assignment of eigenvector $e_j$ and eigenvalues $\lambda_j$ for j=1, 2, - - - P–1 is written as follows.

$$\lambda_1 > \lambda_2 > \ldots > \lambda_{P-1} \qquad \text{Equation [21]}$$

The number of eigenvalues is P–1 or less since the common term (c) has been operated on in the covariance matrix for each standard pattern and, therefore, the degree of independence is decreased by 1. Those skilled in the art will appreciate that this will ultimately result in fewer calculations later.

The eigenvalue $\lambda_j$ obtained becomes an index which indicates to what extent the corresponding eigenvector $e_j$ has the characteristics of a standard pattern. Therefore, as the eigenvalue becomes larger, the corresponding eigenvector becomes more significant in separating the respective standard patterns. The eigenvector $e_j$ respectively has an (N) dimensional orthogonal ground.

(5) Using the eigenvectors $e_j$ obtained by the above process, the normalized standard pattern applying the K-L expansion is rewritten as follows.

$$\tilde{x}_i = c + \sum_{j=1}^{P-1} p_{ij} e_j \qquad \text{Equation [22]}$$

Here, $p_{ij}$ is determined using the following equation.

$$p_{ij} = e_j^T(\tilde{x}_i - c) \qquad \text{Equation [23]}$$

Thus, the original standard pattern is expanded as noted in equations [22] and [23]. This is K-L Expansion notation with (c) representing the common part, and the summation term representing the unique part.

(6) The eigenvalue corresponding to each eigenvector represents the characteristics of each standard pattern. In other words, an eigenvector with a small eigenvalue doesn't contribute significantly to image recognition. According to the K-L Expansion, without performing a primary coupling for all eigenvectors such as in equation [22], it is possible to limit the number of terms to be primarily coupled by accepting errors to some extent. For example, an approximation can be made as follows with the number of coupling terms equal to (K) where K<P–1.

$$\tilde{x}_i = c + \sum_{j=1}^{K} p_{ij} e_j \qquad \text{Equation [24]}$$

The term $p_{ij}$ used here is the same as given by equation [23]. A large number of calculations is required to obtain standard pattern information as expanded by the K-L Expansion, which is described in equation [24]. But, this calculation never depends on the input image. So, as far as the standard pattern is predetermined to be recognized, it can be calculated in advance with only the calculated result stored and retrieved when needed. The value (K) can be determined by experiment by confirming the eigenvalue and the acceptable probability of recognition.

(7) However, the standard pattern is merely expanded by the K-L Expansion in equation [24]. Even though this result is applied to equation [11], the same number of operations should be performed as in the previously proposed system. Although there is an improvement in the probability of recognition, increased processing speed cannot be expected. The number of multiplication operations required for a certain cut out position in a certain standard pattern is approximately (N) for the numerator term of the correlation value. Also, approximately (N) operations are performed for the $|y|$ operation in the denominator term of the correlation value. In case of (P) different standard patterns, approximately (PN) additional operations are required at the denominator because the result of the $|y|$ operation can be commonly utilized. As a result, it can be understood that approximately (P+1)N total calculations are performed.

(8) The invention concerns decreasing the number of terms for which the calculation should be performed depending on the standard pattern. Also, equation [11] is modified to increase the number of terms for which the operations can be commonly performed for a respective pattern. The system of this invention is constructed based on this modified equation. In other words, since there is linear coupling in the numerator of equation [11], distributive law is applied to it as follows.

$$C_i = \frac{c^T y + \sum_{j=1}^{K} p_{ij}(e_j^T y)}{\|\tilde{x}_i\| \|\tilde{y}\|} \qquad \text{Equation [25]}$$

The term of $\tilde{x}_i$ norm is based on an approximation of $\tilde{x}_i$ obtained with equation [24].

The first term and the term $e_j^T y$ in the second term of the numerator require calculation only once whenever a certain image is cut out. This suggests that the increased number of operations caused by the increase in the number of standard patterns is merely a scaler operation which is performed only once.

Figure 3:
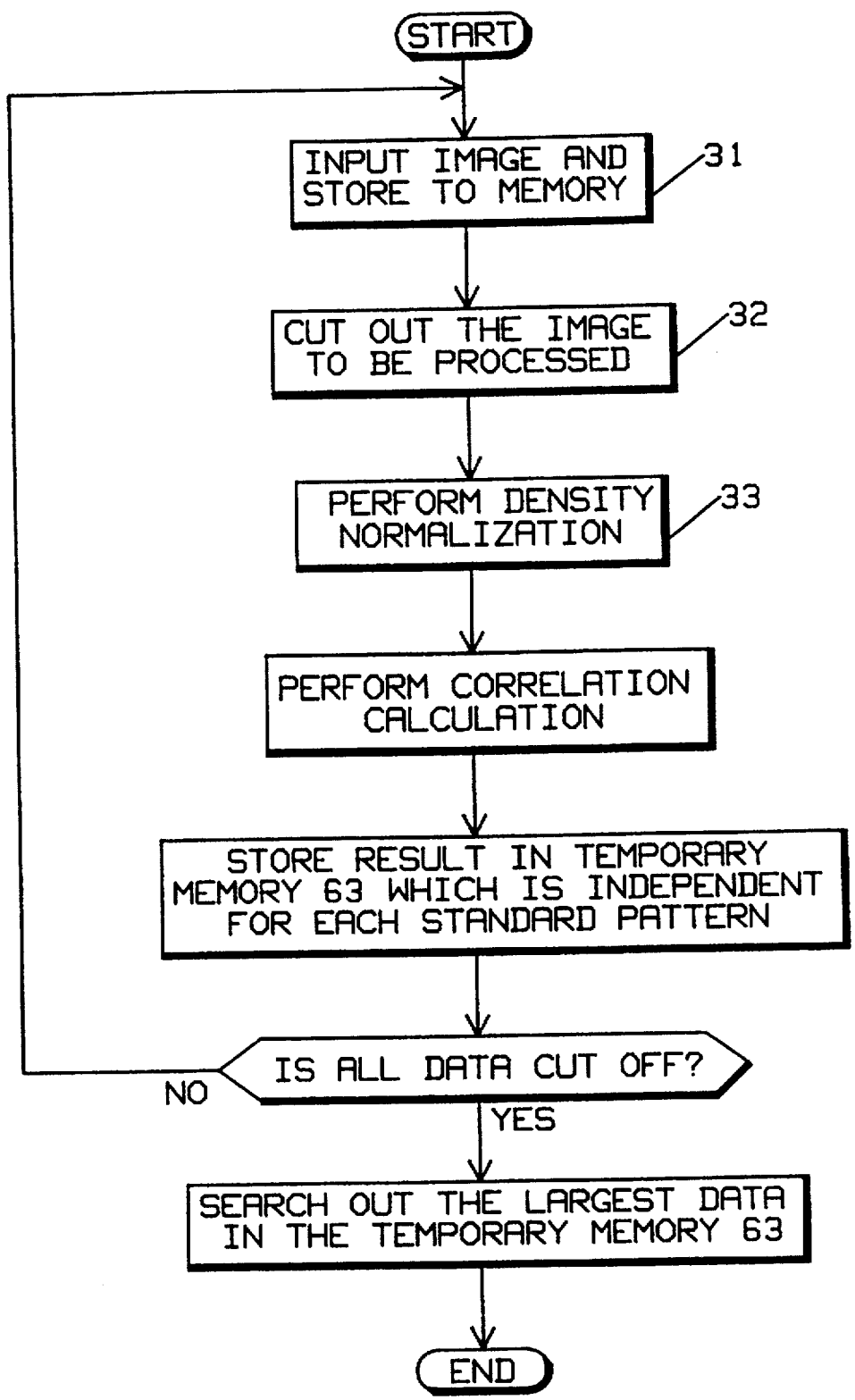
FIG. 3 shows a flow chart of a pattern recognition system as an embodiment of the invention.

An embodiment of the present invention will now be briefly explained with reference to the flow chart diagram of FIG. 3. First, an image is input and stored to memory in an image input port 31. Next, a certain portion of the input image which is to be processed is cut out and retrieved at a cut out port 32. A density normalization operation is then performed on this cut out data at a density normalization port 33. Correlation calculations, to be further explained below, are then performed. The results of the correlation calculation are stored in a temporary memory bank 63 for each of the standard patterns. Another image is input and the above steps are repeated if there is additional data to be cut off. Otherwise, the largest data value in the temporary memory bank 63 is identified.

Figure 4:
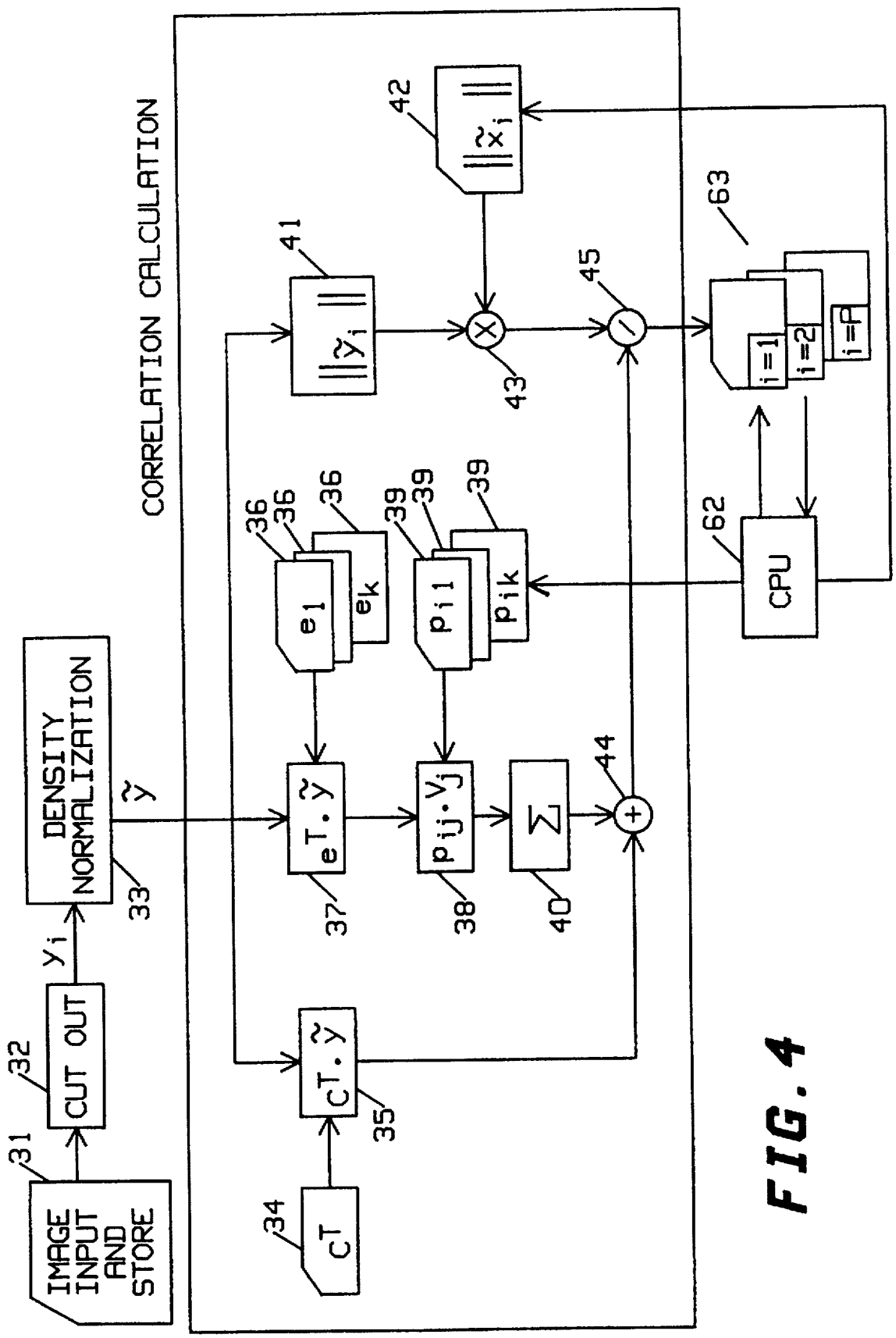
FIG. 4 shows a block diagram of a pattern recognition system as an embodiment of the invention.

The present invention is now explained in greater detail with reference to FIG. 4. An image input port 31 receives and stores an image which is to be recognized. The image is sensed by a camera or similar imaging device. The input is converted here from analog to digital so that digital processing becomes possible. A cut out port 32 cuts and retrieves a certain location out of the input image from the image input port 31. The amount of information cut out at the port 32 has the same number of vector elements as a vector which represents a standard pattern to be recognized. A density normalization port 33 makes a calculation for the mean value of all information for pixels of the cut out area. Utilizing the mean value as an offset amount, an operation is performed by subtracting it from each pixel data value. Specifically, the offset value (a) is obtained for pixels of the cut out area by the following equation.

$$a = \frac{1}{N} \sum_{i=1}^{N} y_i \qquad \text{Equation [26]}$$

Then, with respect to each of the cut out elements, the following calculation is performed.

$$\tilde{y}_i = y_i - a \qquad \text{Equation [27]}$$

The information of cut out pixels thus obtained is represented by vector notation as follows.

$$\tilde{y} = [\tilde{y}_1, \tilde{y}_2, \ldots \tilde{y}_N] \quad \text{Equation [28]}$$

Since this information from the elements is commonly utilized for all standard patterns, it is stored once a specific cut out operation is performed. A store port 36 for eigenvectors is comprised of a memory for storing eigenvector information obtained by the K-L Expansion which has been previously performed for each standard pattern. Specifically, the store port stores $e_j$ (j=1, 2, ..., K) which is obtained from equation [20]. Another store port 39 for weighting information from eigenvectors is comprised of a memory for storing $p_{ij}$, which is determined based on each standard pattern which corresponds to the above eigenvector information. The term $p_{ij}$ (i=1, 2, ... P)(j=1, 2, ... K) is specifically determined by the following equation.

$$p_{ij} = e_j^T(\bar{x}_i - c) \quad \text{Equation [29]}$$

(which is the same as Equation [23]) The term $p_{ij}$ is a scaler quantity. When (i) is specified by a CPU (central processing unit) 62, the output term $p_{ij}$ will correspond to the specified standard pattern.

An operating portion 37 of the eigenvector correlating elements performs an operation to find the inner product between the above-mentioned eigenvector information, $e_j$ (j=1, 2, ...K), and the input image information whose density has already been normalized. It calculates $e_j^T \tilde{y}$. The result is a scaler value $v_j$. Since it is calculated with respect to the eigenvector information $e_j$ (j=1, 2, ..., K), (K) different types of numerical value groups can be obtained. Note that fewer calculations are required at this step than in the analogous step of the previously described method.

An operating portion 38 performs a multiplication operation between the previously obtained scaler value $v_j$ and the weighting information $p_{ij}$ for the eigenvector from store port 39. Since both the previously obtained scaler value $v_j$ and the weighting information $p_{ij}$ for the eigenvector are scaler quantities, (K) multiplication operations are performed for each standard pattern. Note that fewer calculations are required here since there are fewer elements $P_{ij}$.

A summation operation port 40 is an adder portion for adding scaler values. The terms $v_j$ and $p_{ij}$ which were calculated at the operating portion 38 of the pattern-depending correlation elements, are added for each respective scaler value from j=1 to (K). Therefore, the following summation operation is performed.

$$\sum_{j=1}^{K} p_{ij}(e_j^T \tilde{y}) \quad \text{Equation [30]}$$

A store portion 34 of common pattern information stores the vector (c) from equation [18]. The vector (c) represents pattern information which is common to the standard patterns. In other words, an (N) dimensional vector as described in equation [18] is stored.

$$C = [C_1, C_2, \ldots, C_N] \quad \text{Equation [18]}$$

A calculation portion 35 of common pattern correlating elements calculates the inner product for a certain cut out input image multiplied by the vector (c) from equation [18] as common pattern information for all of the standard patterns. The term $c^T \tilde{y}$, the first term in the numerator of equation 25, is calculated from this operation.

An adder portion 44 performs scaler adding of the output from the summation operation port 40 and the calculation portion 35 of common pattern correlating elements. The output of this adder becomes the numerator of equation [25], which shows the correlation value $C_i$ corresponding to the normalized correlation value.

The $|\tilde{y}|$ operating portion 41 calculates the norm of the input image vector which was cut out and obtained by the density normalizing portion 33. The (N) times multiplication (square multiply) operation is applied to a certain cut out. Therefore, the output becomes a scaler quantity.

The $|\tilde{x}_i|$ storing portion 42 is a memory which stores a vector whose length represents the standard pattern for each standard pattern (i). When (i) is specified by CPU 62 for control purposes as will be described later, the norm of $x_i$ corresponding to the specified standard pattern is output. The output value is a scaler quantity.

A multiplier portion 43 performs multiplication operation between the output values of the $|\tilde{y}_i|$ operating portion 41 and the $|\tilde{x}_i|$ storing portion 42. This value becomes equal to the denominator term of the correlating value $C_i$ in equation [25], which corresponds to the normalized correlating value.

A divider portion 45 performs an operation in which the output of adder portion 44 is divided by the output of multiplier portion 43. This operation is performed just once between a certain cut out area and a certain standard pattern. Its output becomes the correlating value $C_i$ in equation [25] which corresponds to the normalized correlating value.

A bank 63 of correlation results is a memory bank which is independent for (P) different kind of standard patterns. A numerical value is stored in a certain bank which is approximately the same as the total numbers of pixels of the input image. It stores the output of the divider portion 45 at an address corresponding to the standard pattern and cut out area to which the operation has been applied.

The CPU 62 selects from the input image, cut out, specification of the standard pattern, and bank of the correlation result. It can read the stored information from the correlation results bank 63. The highest value is selected as indicating the closest image.

The operation of this apparatus will be described next. The image derived from the image input portion 31 is converted from analog to digital. By means of the operation of the cut out portion 32, a location is cut out and retrieved as specified by the CPU 62. The retrieved image information is normalized by the density normalized portion 33 so that the mean value becomes zero.

The CPU 62 specifies a specific kind (i) of standard pattern. The store port 39 for weighting information of eigenvectors generates an output $p_{ij}$.

The inner products are calculated between the output of the density normalizing portion 33 and the information (i) regarding the common pattern stored in the storing portion 34 for common pattern information. The term $c^T \tilde{y}$, which is the first term in the numerator of equation 25, is calculated from this operation. Note that this operation is performed just once for each cut out area. It results in (N) multiplying operations for each area. On the other hand, the output of the density normalizing portion 33 becomes a basis for calculating $e_j^T \tilde{y}$ at the operating portion 37 of the eigenvector correlating elements. Since the operation is performed (N) times for each eigenvector containing information for a certain cut out area, the number of operations for performing the operation for all of the eigenvectors for a certain cut out area is (NK). However, it is important to note that this operation is required only of standard pattern of the kind of standard pattern for pattern matching.

The summation operation is performed through the operating portion 38 of pattern-depending correlation elements so that the second term in the numerator of equation [25] can be calculated. The operating portion 38 of pattern-depending correlation elements performs its operation whenever a standard pattern is processed as specified by the CPU 62.

Therefore, (KP) operations are performed in calculating all standard matching patterns for a certain cut out area.

The |ỹ| operation portion 41 performs an operation seeking the norm |ỹ| of information regarding the normalized cut out area. The result is multiplied at a multiplier 43 by |x̃$_i$|, which is derived from the |x̃$_i$| store portion 42 corresponding to a specific kind (i) of standard pattern as specified by the CPU 62. This is the operation for seeking the denominator term of the correlating value $C_i$.

Next, the values in the numerator and denominator are divided at a portion 45. The divided result is stored at an address correlation result bank 63 corresponding to the specified standard pattern (i) and the cut out location as specified by the CPU 62.

Scanning in the correlation result bank 63 by CPU 62, a peak value is detected for each standard pattern. As a result, an object can be detected as registered by a standard pattern at a cut out location which corresponds to an address where the peak value of correlation has been detected.

Considering the number of multiplication operations with respect to a certain cut out location of all standard patterns, there are (N) operations at the calculation portion 35 of common pattern correlating elements, (NK) operations at the operating portion 37 of eigenvector correlating elements, (PK) operations at the calculation portion 38 of pattern dependency correlation elements, and (N) operations at the |ỹ| operation portion 41. It is thus understood that there is a total of approximately N(K+2)+PK operations.

By experiment, satisfactory results have been obtained in recognizing general parts by preparing different standard patterns, where each is incrementally rotated by approximately 4 degrees. Under this condition, values of P=90, K=10 and N=10,000 are obtained. In this condition, about 900,000 operations would be performed based on the previously proposed example in which the number of operations is (P+1)N. Based on this embodiment of the present invention, however, only approximately 120,000 operations are required as determined from the equation N(K+2)+PK. The number of required operations with the present invention is thus approximately one eighth (⅛) the number required with the previous method. The present invention therefore makes high speed processing possible.

Figure 5:
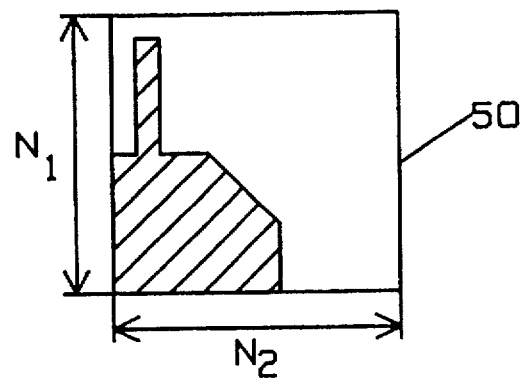
FIG. 5 shows an example of standard patterns to which the invention can be applied.
Figure 6:
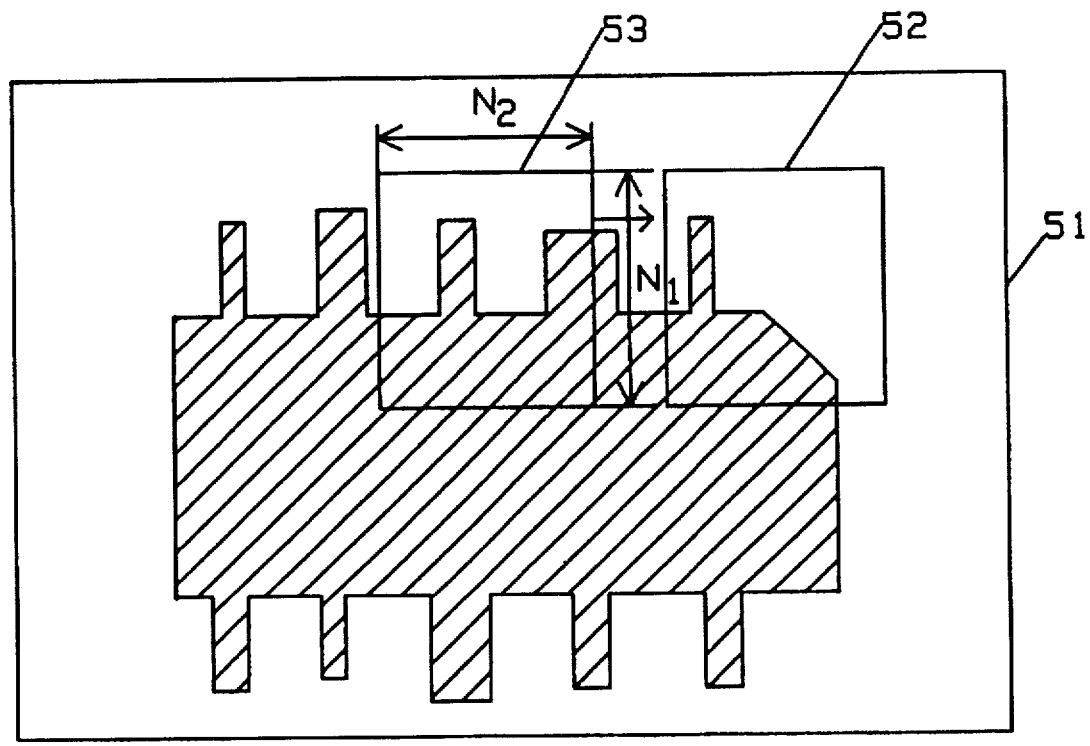
FIG. 6 shows an example of an image to which the invention can be applied.

In the description of this embodiment, an example was shown in which a certain object is registered as standard pattern. A part 50 of the object such as shown in FIG. 5 is also registered. In the case where a picture 51 of a certain object is taken such as shown in FIG. 6 and matched with a standard pattern in FIG. 5, the CPU 62 sends an order to scan the cut out portion 53 in turn. Moreover, by tracking the correlating values, the peak value is detected at the corner portion 52. Therefore, the detection of location can be completed.

Figure 7:
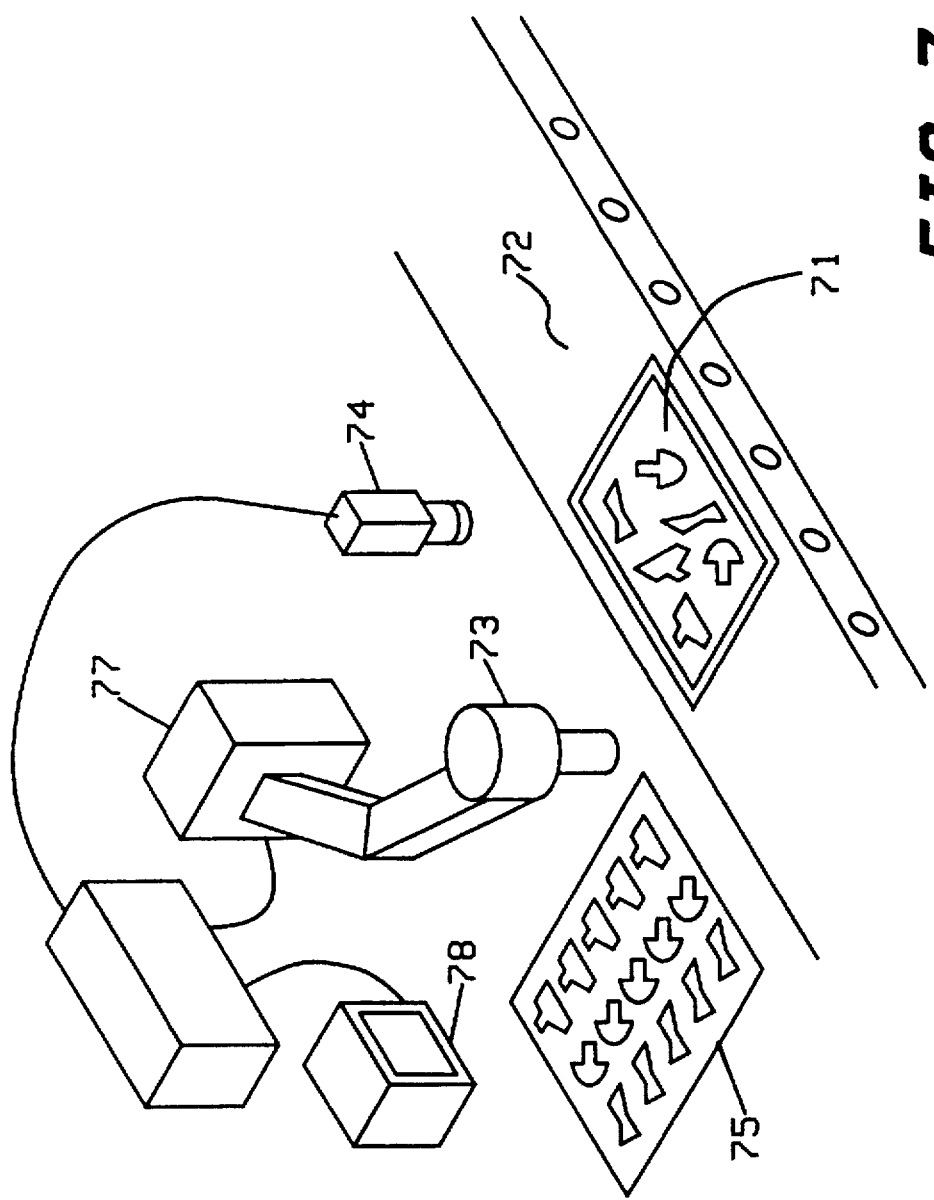
FIG. 7 shows an example of an assembly system to which the invention can be applied

An example of a system in accordance with the present invention is shown in FIG. 7. This example is an apparatus for mounting parts in a printed board. The printed board 71 is a work on which parts should be mounted. It is carried on a conveyor belt 72. The conveyor belt 72 is an apparatus which carries the printed board and stops and fixes it at a position where parts are mounted. A mounting tool 73 has a chucking device at the operational end of the transport apparatus, which can be a robot which makes transport and supply possible. A CCD (close coupled device) camera 74 is a picture taking device to provide information to the image input port 31. The image is provided as an input to detect a location where the parts should be mounted.

The parts to be mounted on a printed board 71 are aligned and put on a tray 75. The tray is disposed at a location where the mounting tool 73 retrieves the parts.

A controller 77 controls the mounting tool, an image recognition apparatus 76, the robot and the chucking device. The image recognition apparatus 76 is the recognition portion of the invention. It determines and transfers to the controller 77 the location and orientation of supplied parts based on the image information taken from the print board 71 by a CCD camera 74. A monitor 78 is an apparatus for displaying, for example, the status of the CPU 62 and the result of the input image.

The operation of this system will be explained next. When a printing board is conveyed by a conveyer belt and arrives at a certain position for mounting, its image is sensed by the CCD camera. Based on the image information of the printing board, the location and orientation for supplying parts is determined. When this result is transferred to the controller 77, the mounting tool is controlled to retrieve necessary parts out of certain parts trays and transport and supply them to the location previously determined. The assembly operation is thus performed.

If necessary, it is possible to exchange the standard patterns. In other words, the common pattern information 34, the eigenvector information 36, the weighting information of eigenvector 39, and the pattern distance information can be replaced so that the process can be performed on other parts.

The present invention may be implemented using, for example, the commercially available SONY VISION SYSTEM using a SONY XC-77 camera to produce a 512×512 NTSC black and white image. This system can be programmed in C language with the image information (35 and 37) computed using VLSI circuits shown in U.S. patent application Ser. No. 08/18,075 filed Jan. 13, 1994 claiming priority of Japanese patent application number TOKU-GAN-HEI 5-11807 (which is hereby incorporated by reference), and made available as a routine called by the C language. While the present invention has been described in terms of a system for finding rotated objects, those skilled in the art will find many other uses for such a system.

The present invention is further explained in a draft paper attached herewith as Appendix I. As of the filing date of this application, Appendix I has not been published and is coauthored by the Inventor, Shin-ichi Yoshimura of Sony Corporation and Dr. Takeo Kanade of the Robotics Institue of Carnegie Mellon University. This draft paper as it appears in Appendix I is incorporated by reference herein.

While the invention has been described in conjunction with specific embodiments, it is evident that many alternatives, modifications, permutations and variations will become apparent to those skilled in the art in light of the foregoing description. For example, the present invention can be embodied in a programmed general purpose computer, or selective elements can be embodied in hardware. Other embodiments will occur to those skilled in the art.

What is claimed is:

1. A system for recognizing a pattern, comprising:
   a first memory for storing a common pattern obtained by Karhunen-Loéve Expansion of standard patterns;
   a second memory for storing eigenvectors obtained by Karhunen-Loéve Expansion of said standard patterns;
   a third memory for storing weighting coefficients corresponding to said eigenvectors of said standard patterns;
   cut-out means for cutting out a cut-out area of an image to be processed;
   density normalizing means for producing a normalized cut-out area by subtracting a mean value of information in said cut out area, from said cut-out area;

means for generating common pattern correlating elements by obtaining an inner product between said common pattern and said normalized cut out area;

means for generating eigenvector correlating elements by obtaining an inner product between said eigenvectors and said normalized cut out area;

means for generating pattern-depending correlation elements by summing said eigenvector and said weighting coefficients;

an adder for generating a correlating numerator by adding said common pattern correlating elements and said pattern-depending correlation elements;

means for calculating a norm of pixel values $y_i$ in said cut-out area $|y_i|$, where i is an integer number of pixel values;

means for calculating a norm of pixel values $x_i$ in said standard pattern $|x_i|$;

a multiplier for producing a correlative denominator by multiplying said norm of $y_i$ with said norm of $x_i$; and a divider for dividing the correlating numerator by the correlative denominator.

2. A method for recognizing a pattern comprising the steps of:

storing a common pattern obtained by Karhunen-Loeve Expansion of standard patterns;

storing eigenvectors obtained by Karhunen-Loeve Expansion of said standard patterns;

storing weighting coefficients corresponding to said eigenvectors of said standard patterns;

cutting out a cut-out area of an image to be processed;

density normalizing for producing a normalized cut-out area by subtracting a mean value of information in said cut out area from said cut-out area;

generating common pattern correlating elements by obtaining an inner product between said common patterns and said normalized cut out area;

generating eigenvector correlating elements by obtaining an inner product between said eigenvectors and said normalized cut out area;

generating pattern-depending correlation elements by summing said eigenvector and said weighting coefficients;

generating a correlating numerator by adding said common pattern correlating elements and said pattern-depending correlation elements;

calculating a norm of pixel values $y_i$ in said cut-out area $||y_i||$, where i is an integer number of pixel values;

calculating a norm of pixel values $x_i$ in said standard pattern $||x_i||$;

producing a correlative denominator by multiplying said norm of $y_i$ with said norm of $x_i$; and dividing the correlating numerator by the correlative denominator.

* * * * *